(12) United States Patent
Boileau et al.

(10) Patent No.: US 11,542,865 B2
(45) Date of Patent: Jan. 3, 2023

(54) AIR INFLOW LIP FOR TURBOJET NACELLE

(71) Applicant: Safran Nacelles, Gonfreville l'Orcher (FR)

(72) Inventors: Patrick Boileau, Gonfreville l'Orcher (FR); Caroline Coat-Lenzotti, Gonfreville l'Orcher (FR); Marc Versaevel, Gonfreville l'Orcher (FR); Virginie Emmanuelle Anne Marie Digeos, Gonfreville l'Orcher (FR); Pierre-François Behaghel, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 229 days.

(21) Appl. No.: 16/901,733

(22) Filed: Jun. 15, 2020

(65) Prior Publication Data

US 2020/0309029 A1    Oct. 1, 2020

Related U.S. Application Data

(63) Continuation of application No. PCT/FR2018/053269, filed on Dec. 13, 2018.

(30) Foreign Application Priority Data

Dec. 13, 2017    (FR) ..................... 17/62065

(51) Int. Cl.
*F02C 7/047*    (2006.01)
*B64C 7/02*    (2006.01)
*F02C 7/045*    (2006.01)

(52) U.S. Cl.
CPC ............ *F02C 7/047* (2013.01); *B64C 7/02* (2013.01); *F02C 7/045* (2013.01);
(Continued)

(58) Field of Classification Search
CPC . F02C 7/045; F02C 7/047; B64C 7/02; F05D 2220/32; F05D 2260/2214; F05D 2260/963
See application file for complete search history.

(56) References Cited

U.S. PATENT DOCUMENTS

| 8,172,037 B2 | 5/2012 | Porte et al. |
| 2002/0139900 A1 | 10/2002 | Porte et al. |

(Continued)

FOREIGN PATENT DOCUMENTS

| EP | 0913326 | 5/1999 |
| EP | 1103462 | 5/2001 |

(Continued)

OTHER PUBLICATIONS

International Search Report for International Application PCT/FR2018/053269, dated Feb. 27, 2019.

*Primary Examiner* — Steven M Sutherland
(74) *Attorney, Agent, or Firm* — Burris Law, PLLC (57) ABSTRACT

An air inflow lip of a nacelle for a turbojet of an aircraft, including a cavity defined by a leading edge of the nacelle and by an annular wall, includes an inner wall, an acoustic treatment device, and a pneumatic de-icing device including a de-icing fluid supply device. The inner wall of the air inflow lip includes acoustic boreholes and the pneumatic de-icing device includes a honeycombed de-icing plate mounted inside the cavity on the inner wall of the air inflow lip. Also included are conduits for the circulation of a de-icing fluid and acoustic wells communicating with the acoustic boreholes.

15 Claims, 4 Drawing Sheets

(52) U.S. Cl.
   CPC .. *F05D 2220/32* (2013.01); *F05D 2260/2214* (2013.01); *F05D 2260/963* (2013.01)

(56) References Cited

U.S. PATENT DOCUMENTS

| | | |
|---|---|---|
| 2010/0276548 A1 | 11/2010 | Porte et al. |
| 2010/0314082 A1 | 12/2010 | Porte et al. |
| 2011/0139927 A1* | 6/2011 | Porte ................. B64D 15/04 244/1 N |
| 2012/0090693 A1 | 4/2012 | Chelin et al. |
| 2012/0317782 A1 | 12/2012 | Porte et al. |
| 2012/0318924 A1* | 12/2012 | Porte ................. B64D 33/02 244/134 D |
| 2014/0216846 A1* | 8/2014 | Hurlin ................. B64D 29/00 156/60 |
| 2017/0089238 A1 | 3/2017 | Leyko et al. |

FOREIGN PATENT DOCUMENTS

| | | |
|---|---|---|
| FR | 2953811 | 6/2011 |
| FR | 2981049 | 4/2013 |
| WO | 2015071609 | 5/2015 |
| WO | 2016102691 | 6/2016 |

* cited by examiner

UPSTREAM  DOWNSTREAM

AIR INFLOW LIP FOR TURBOJET NACELLE

CROSS-REFERENCE TO RELATED APPLICATIONS

This application is a continuation of International Application No. PCT/FR2018/053269, filed on Dec. 13, 2018, which claims priority to and the benefit of FR 17/62065 filed on Dec. 13, 2017. The disclosures of the above applications are incorporated herein by reference.

FIELD

The present disclosure relates to a nacelle air inlet lip for an aircraft turbojet engine.

BACKGROUND

The statements in this section merely provide background information related to the present disclosure and may not constitute prior art.

Aircraft turbojet engines generate pollution, and the industry is aiming at reducing this pollution, especially as turbojet engines are becoming more and more powerful. The design of the nacelle surrounding a turbojet engine contributes to the reduction of this noise pollution.

In order to further improve the acoustic performance of aircraft, the nacelles are provided with acoustic panels aimed at attenuating noise generated by the turbojet engines.

In general, such acoustic panels are installed on the nacelle surrounding the turbojet engine at the inlet and/or outlet of the fan channel of the turbojet engine.

A nacelle for an aircraft turbojet engine typically has several functions such as channeling the air flow entering and exiting the motor, reversing the thrust of the turbojet engine, or even integrating noise attenuation and de-icing devices.

During a flight phase of an aircraft, it is possible that the altitude and climatic conditions cause frost/ice formation at different locations on the aircraft. Frost may, for example, be formed on the nacelle of the turbojet engine, in particular, on the leading edge of the nacelle. Such frost formation is unacceptable, as it can lead to changes in the aerodynamic profile of the nacelle and can also damage the turbojet engine when the ice blocks which were formed on the air inlet lip of the nacelle break off.

A device inhibiting the formation of frost and ice on the nacelle is often equipped on the nacelle of the turbojet engine, and in particular the air inlet lip.

Such devices are, in a known manner, made by withdrawing the hot gases from the compressor of the turbojet engine and by redirecting them onto the surface of the nacelle which can be affected by the frost formation.

A recurring issue is linked to the coexistence of acoustic absorption and de-icing devices. Indeed, in general, an acoustic absorption panel is a sandwich structure whose back skin is waterproof. Consequently, integrating an acoustic panel to the lip inhibits its de-icing because only the back skin of the panel would be heated.

The document EP 0 913 326 proposes installation of a "Piccolo" tube inside the air inlet lip of the nacelle or a system for rotating circulation of the de-icing fluid, allowing injecting a de-icing fluid through the alveolar core structure forming the intermediate layer of the acoustic absorption device.

The document EP 1 103 462 also describes a system for rotating circulation of a de-icing fluid, a "swirl" tube, which delivers a de-icing fluid then passing through an alveolar core structure of an acoustic treatment device.

A drawback common to these applications is that the acoustic treatment is disturbed by the de-icing fluid, which causes a degradation of the acoustic absorption device.

In addition, a very significant air flow rate would be necessary due to the significant acoustic surface.

A solution of the prior art consists in integrating the de-icing function in the acoustic treatment function. For this purpose, channels for circulating a de-icing fluid are arranged inside the core of the acoustic sandwich.

This is for example disclosed in FR 2 981 049, WO 2015/071609, U.S. Pat. No. 8,172,037, U.S. Patent No. 2012/0317782 and FR 2 953 811.

In all these documents, the acoustic damping volume is defined by the alveolar core structure, which includes a circulation volume of a de-icing fluid.

The circulation volume of the de-icing fluid is obtained by the integration of de-icing fluid circulation conduits, fastened inside the alveolar core structure or directly formed in the alveolar core structure.

The integration of these conduits is difficult to carry out given the materials used to make the alveolar core structures such as the "honeycomb" type structures Moreover, the seal between the de-icing fluid circulation conduits and the honeycomb alveolar core acoustic treatment structure is difficult to obtain.

SUMMARY

This section provides a general summary of the disclosure and is not a comprehensive disclosure of its full scope or all of its features.

The present disclosure is directed to a nacelle air inlet lip for an aircraft turbojet engine, including a cavity delimited, on the one hand, by a leading edge of the nacelle and, on the other hand, by an annular partition, the air inlet lip including an inner wall, an acoustic treatment device, and a pneumatic de-icing device including a de-icing fluid supply device. The nacelle air inlet is remarkable in that the inner wall of the air inlet lip includes a plurality of acoustic bores and in that the pneumatic de-icing device includes at least one cellular de-icing base plate, mounted inside the cavity on the inner wall of the air inlet lip, the cellular de-icing base plate including a plurality of conduits for circulating a de-icing fluid from the de-icing fluid supply device and a plurality of acoustic wells communicating with the acoustic bores of the inner wall of the air inlet lip, the acoustic treatment device being fastened on a top wall of the cellular de-icing base plate and being at least partially superimposed on the cellular de-icing base plate.

Thus, by dissociating the main portion of the acoustic treatment device from the de-icing device, it is no longer necessary to change the structure of the acoustic treatment device so that it integrates the pneumatic de-icing device. The integration of the acoustic treatment and de-icing functions in the air inlet lip is thus facilitated.

Given the fact that the acoustic cells of the acoustic treatment device are superimposed on the de-icing base plate, no machining is necessary to integrate the de-icing fluid circulation conduits.

In addition, by providing for structurally separating the de-icing device from the acoustic treatment device, the manufacture of these devices is simplified, and a greater functional and structural autonomy is obtained between these devices.

The structural shape of the de-icing base plate is not linked or dependent on that of the acoustic cells which are related to the de-icing base plate.

The de-icing base plate according to the present disclosure also allows improving the anti-icing function by a network of de-icing fluid circulation conduits, which can be non-linear or distributed.

According to optional forms of the air inlet lip of the present disclosure, the acoustic wells of the cellular de-icing base plate open at bottom and top lateral walls of the cellular de-icing base plate, the conduits for circulating a de-icing fluid of the cellular de-icing base plate open at least at upstream and downstream lateral walls of the cellular de-icing base plate and the cellular de-icing base plate includes at least one deflector arranged to capture the de-icing fluid from the de-icing fluid supply device.

In other forms of the present disclosure, the cellular de-icing base plate includes at least one exchange surface configured to conduct the de-icing fluid from the de-icing fluid supply device by conduction through the cellular de-icing base plate, the de-icing fluid supply device includes a tube for injecting a de-icing fluid arranged inside the cavity of the air inlet lip, the injection tube including a plurality of bores configured to deliver a de-icing fluid inside the cavity, and the cellular de-icing base plate includes at least one de-icing fluid injection nozzle communicating with at least one of the conduits for circulating the de-icing fluid, the at least one injection nozzle being arranged substantially opposite to at least one of the bores of the tube for injecting a de-icing fluid, and the cavity of the air inlet lip receives a wall for blocking the de-icing fluid, annularly mounted upstream of an outlet of the de-icing fluid supply device. Thus, when a de-icing fluid is introduced into the cavity of the air inlet lip, the annular wall, thus arranged, forces the de-icing fluid to be introduced into the de-icing base plate, from downstream to upstream of the de-icing base plate and the cellular de-icing base plate of the acoustic de-icing device has a thickness between 2 mm and 20 mm, and in one form between 5 mm and 15 mm.

In at least one form of the present disclosure, an area of the top wall of the cellular de-icing base plate is substantially equal to an area of a bottom wall of the acoustic treatment device, the conduits for circulating the de-icing fluid are unevenly distributed inside the cellular de-icing base plate, and the cellular de-icing base plate is fastened on the inner wall of the air inlet lip by brazing and/or by gluing.

According to a variation of the present disclosure, the cellular de-icing base plate includes an edge for fastening to the inner wall of the air inlet lip, the fastening edge being connected to the inner wall by riveting and/or by screwing.

According to another variation of the present disclosure, the cellular de-icing base plate includes an edge for fastening to the inner wall of the air inlet lip and the air inlet lip includes a flange for fastening the cellular de-icing base plate, the fastening flange being mounted on the inner wall of the air inlet lip and on the edge for fastening the cellular de-icing base plate and the top wall of the cellular de-icing base plate includes at least one bore configured to provide a communication between the cellular de-icing base plate and the acoustic treatment device. This allows obtaining an acoustic continuity between the acoustic treatment device and the de-icing base plate, where the acoustic treatment device is fastened on the top wall of the cellular de-icing base plate by gluing and/or by brazing and/or by riveting and/or by screwing, the air inlet lip includes a plurality of cellular de-icing base plates distributed over an entire circumference of the inner wall of the air inlet lip and the air inlet lip includes a plurality of cellular de-icing base plates distributed over the entire circumference of the inner wall of the air inlet lip, where the cellular de-icing base plates are embedded or nested to each other.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
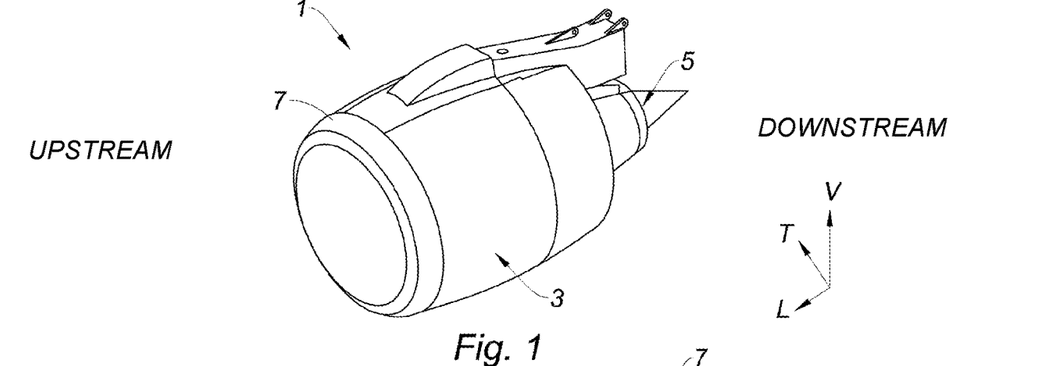
FIG. 1 is an isometric view of a propulsion unit, according to the teachings of the present disclosure.

In the description and in the claims, the terms "upstream" and "downstream" should be understood relative to the circulation of the air flow inside the propulsion unit formed by the nacelle and the turbojet engine, that is to say from left to right with reference to FIG. 1.

Likewise, the terms "inner" and "outer" will be used without limitation with reference to the radial distance relative to the longitudinal axis of the nacelle, the term "inner" defining a zone which is radially closer to the longitudinal axis of the nacelle, in contrast to the term "outer".

Moreover, in the description and the claims, in order to clarify the description and the claims, the terminology longitudinal, vertical and transverse will be adopted without limitation with reference to the trihedron L, V, T indicated in the figures.

Furthermore, in all figures, identical or similar references represent identical or similar members or sets of members.

In FIG. 1 a propulsion unit 1 is represented, including a nacelle 3 supporting an aircraft turbojet engine 5. The nacelle 3 includes an upstream section including an air inlet 7.

Figure 2:
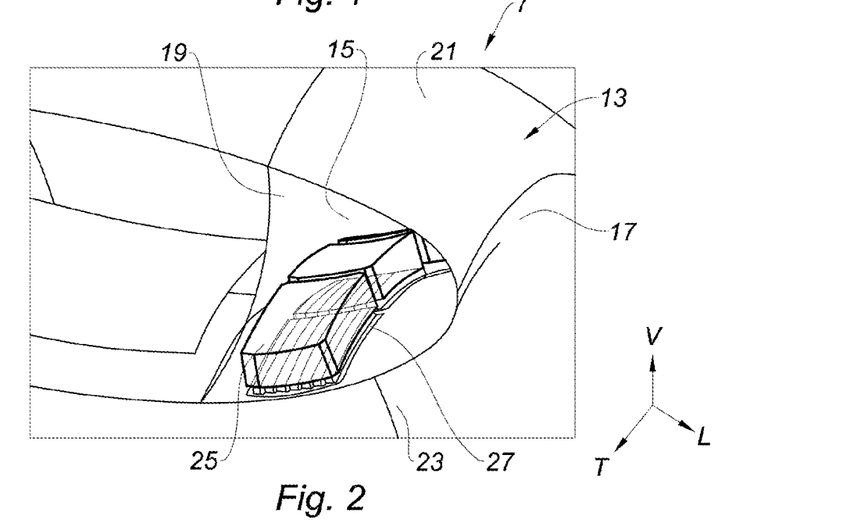
FIG. 2 is a perspective detailed view of the air inlet of a nacelle of FIG. 1.

With reference to FIG. 2, which illustrates a portion of the air inlet 7 of the nacelle of FIG. 1, the air inlet 7 includes an air inlet lip 13. The air inlet lip 13 includes a cavity 15 delimited, on the one hand (a first side of the cavity), by a leading edge 17 of the nacelle and, on the other hand (a second side of the cavity), by an annular partition 19.

The leading edge 17 of the nacelle connects an outer wall 21 of the air inlet lip 13 and an inner wall 23 of the air inlet lip. The assembly formed by the leading edge 17, the outer wall 21 and the inner wall 23, is made in one piece by the same skin.

The air inlet lip includes an acoustic treatment device 25. The acoustic treatment device 25 may for example comprise a "honeycomb" type alveolar core structure known from the prior art, including a plurality of acoustic cavities defined by alveoli.

Figure 6:
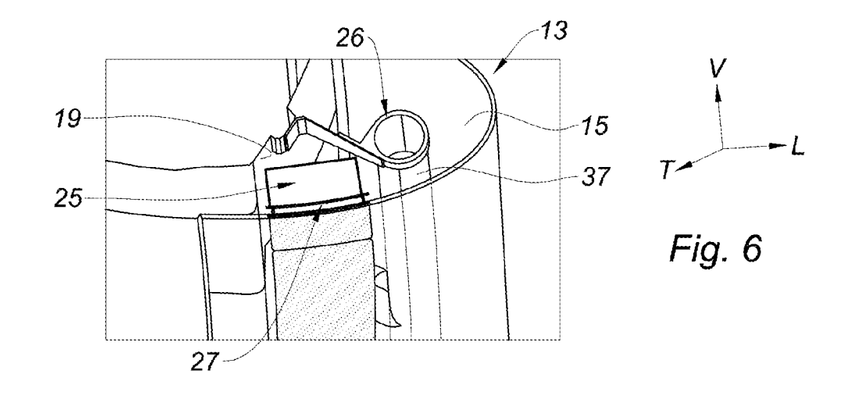
FIG. 6 illustrates a first form of the air inlet lip, according to the teachings of the present disclosure.

The air inlet lip further includes a pneumatic de-icing device, which includes a de-icing fluid supply device 26 (shown in particular in FIG. 6).

According to the present disclosure, the pneumatic de-icing device includes a cellular de-icing base plate 27, of a design which is distinct and independent from the acoustic treatment device 25.

The cellular de-icing base plate 27 is mounted on the inner wall 23 of the air inlet lip 13, inside the cavity 15 of the air inlet lip.

The inner wall 23 of the lip includes a plurality of acoustic bores 28 (shown in FIG. 4) in line with each cellular de-icing base plate 27.

This allows making an acoustic absorber, formed by the acoustic treatment device 25 and cellular de-icing base plate 27 pair, the acoustic cavities of the acoustic absorber are formed by acoustic wells integrated into the cellular de-icing base plate 27 (as described in detail with reference to FIG. 3) and by acoustic cavities defined by the alveoli of the acoustic treatment device 25.

The acoustic treatment device 25 is fastened on a top wall of the cellular de-icing base plate, for example, by at least one of gluing, brazing, and any other adapted fastening approaches such as by riveting, screwing, or other processes.

Carrying out the fastening of the cellular de-icing base plate 27 on the air inlet lip is given in the following description, with reference to FIGS. 12 to 14.

The acoustic treatment device 25 is fastened on a top wall of the cellular de-icing base plate 27, such that the acoustic treatment device 25 is superimposed on the cellular de-icing base plate 27. The acoustic treatment device 25 may include a plurality of honeycomb alveoli. When the acoustic treatment device is fastened on a top wall of the de-icing base plate, a solid skin can cover a top wall of the acoustic treatment device, this in order to seal the alveoli of the acoustic treatment device.

The air inlet lip 13 of the present disclosure receives a plurality of acoustic treatment devices 25 and a plurality of cellular de-icing base plates 27. In at least one form of the present disclosure, the cellular de-icing base plates 27 and the acoustic treatment devices 25 are distributed over the entire circumference of the air inlet lip 13.

Two adjacent cellular de-icing base plates can for example be fitted, embedded or nested to each other. Likewise, two adjacent de-icing devices can for example be fitted to each other, so as to define a continuous distribution of the acoustic treatment device/cellular de-icing base plate pair, over the entire circumference of the air inlet lip.

Alternatively, two adjacent cellular de-icing base plates may not be nested or embedded to each other, but simply positioned side by side without continuity.

Figure 3:
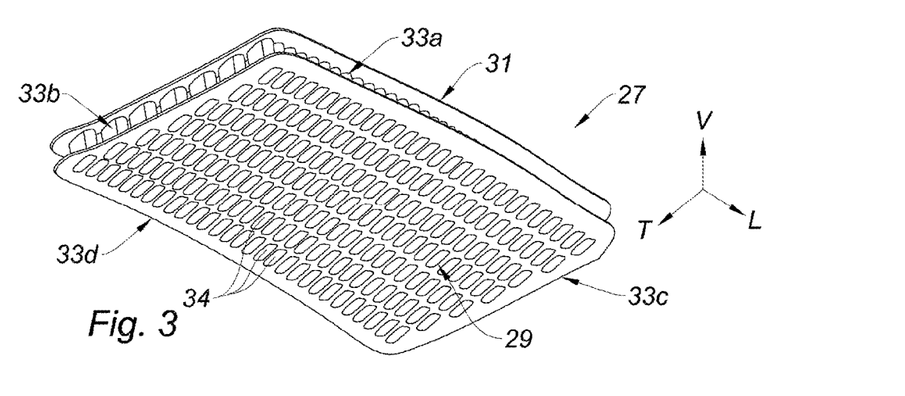
FIG. 3 illustrates a cellular de-icing base plate, according to a first variation of the present disclosure.

Reference is made to FIG. 3 which illustrates a cellular de-icing base plate 27 according to the present disclosure.

The cellular de-icing base plate 27 adopts, by way of example, a rectangular parallelepiped shape including a bottom wall 29, configured to be fastened to the inner wall of the air inlet lip, a top wall 31, on which the acoustic treatment device is configured to be mounted, and four lateral walls 33a, 33b, 33c, 33d.

The area defined by the top wall 31 of the cellular de-icing base plate is substantially equal to that defined by a bottom wall of the acoustic treatment device. Unlike the prior art where unit channels for circulating the de-icing fluid are each mounted on the bottom wall of the acoustic treatment device, this configuration enables dissociating the acoustic treatment function from that of de-icing the main acoustic volumes, and simplifying the arrangement of the acoustic treatment device and the de-icing device in the air inlet lip. Indeed, it is sufficient with the present disclosure to mount the acoustic treatment device on the cellular de-icing base plate, for example by at least one of gluing, brazing, or any other adapted fastening approaches such as by riveting screwing, among other processes.

The lateral walls 33a and 33d define respectively upstream and downstream transverse lateral walls when the cellular de-icing base plate is mounted in the air inlet lip, related to the trihedron L, V, T defined in the figures and in the direction of circulation of the air flow inside the propulsion unit. Similarly, the lateral walls 33b and 33c define, in turn, longitudinal lateral walls when the cellular de-icing base plate is mounted in the air inlet lip, related to the trihedron L, V, T defined in the figures.

By way of example, the thickness of the cellular de-icing base plate 27, defined by the distance separating the bottom wall 29 from the top wall 31 of the cellular de-icing base plate, is between about 2 mm and about 20 mm. In another form of the present disclosure, the thickness of the cellular de-icing base plate 27 is between about 5 mm and about 15 mm.

The cellular de-icing base plate 27 includes a set of acoustic wells 34, opening at the bottom wall 29 and top walls 31 of the cellular de-icing base plate 27.

The acoustic wells 34 communicate with the acoustic bores 28 of the inner wall 23 of the air inlet lip.

The acoustic wells 34 are thus arranged in the de-icing base plate in a substantially vertical direction with reference to the trihedron L, V, T represented in the figures.

The acoustic wells 34 have a section whose shape can be substantially identical to that of the acoustic bores 28 of the inner wall 23.

According to the represented example, the acoustic bores 28 adopt an oblong shape. The section of the acoustic wells 34 is in this case also oblong.

The acoustic wells 34 allow the passage of sound waves from the propulsion unit. The sound waves which pass through the acoustic wells 34 of the cellular de-icing base plate are then acoustically attenuated by the acoustic treatment device 25.

Figure 4:
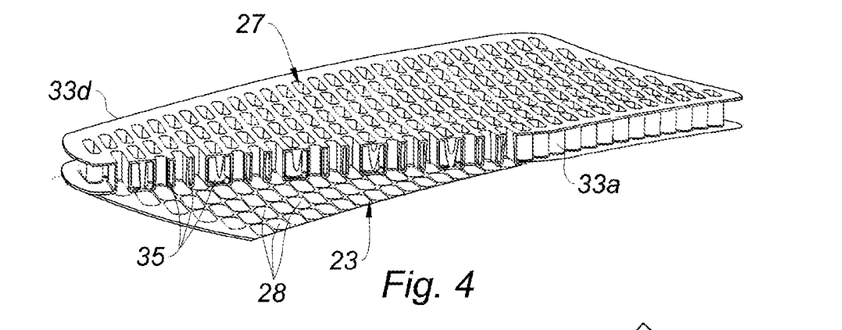
FIG. 4 is a partial cross-sectional isometric view of the cellular de-icing base plate of FIG. 3.

As represented in FIG. 4 which illustrates a partial cross-sectional isometric view of the cellular de-icing base plate 27, the cellular de-icing base plate 27 further includes a plurality of conduits 35 for circulating the de-icing fluid. The conduits 35 for circulating the de-icing fluid are between the acoustic wells 34, for example in a substantially longitudinal direction.

The conduits 35 for circulating the de-icing fluid are made of a sealed material. Thus, the de-icing fluid circulating in the conduits 35 is not found introduced inside the acoustic wells 34, which inhibits altering the acoustic performance of the cellular de-icing base plate 27. In some forms of the present disclosure, the cells of the cellular de-icing base plate 27 are alveolar or honeycombs. The de-icing fluid comes from the de-icing fluid supply device, the operation of which is described in detail in the following description, with reference to FIGS. 6 to 12.

The conduits 35 for circulating the de-icing fluid of the cellular de-icing base plate open at the upstream 33a and downstream 33d lateral walls of the cellular de-icing base plate 27.

The conduits 35 for circulating the de-icing fluid are, in another form of the present disclosure, over the entire thickness of the cellular de-icing base plate 27. The conduits 35 for circulating the de-icing fluid are, for example, evenly distributed inside the base plate, that is to say that all circulation conduits have a shape which is identical relative to each other.

Figure 5:
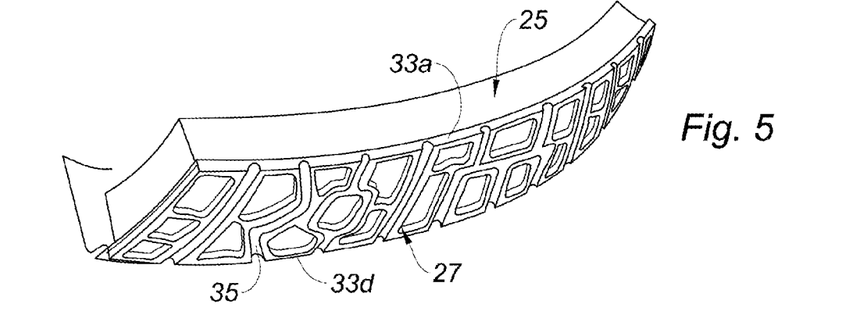
FIG. 5 is an isometric bottom view of a cellular de-icing base plate/acoustic treatment device pair, the cellular de-icing base plate being obtained, according to a second variation of the present disclosure.

According to a variation represented in FIG. 5 which illustrates an isometric bottom view of a cellular de-icing base plate 27 and an acoustic treatment device 25 pair, the conduits 35 for circulating the de-icing fluid are unevenly distributed inside the cellular de-icing base plate, that is to say that the conduits for circulating the de-icing fluid have shapes which are distinct from each other, which allows improving the cellular de-icing base plate depending on the desired heating distribution. The arrangement of the conduits for circulating the de-icing fluid relative to the volume of the acoustic treatment device can be adapted in shape, section and surface to find the best thermal-acoustic compromise.

The conduits 35 for circulating the de-icing fluid of the cellular de-icing base plate open at the upstream 33a and downstream 33d lateral walls of the cellular de-icing base plate 27.

Reference is made to FIG. 6 which illustrates a first form of the air inlet lip according to the present disclosure.

The de-icing fluid supply device 26 includes a tube 37 for injecting a de-icing fluid, of the "Piccolo" tube type known from the prior art.

The tube 37 for injecting a de-icing fluid adopts a ring shape annularly mounted on the annular partition 19 closing the cavity 15 of the air inlet lip 13.

The tube 37 includes a plurality of bores (not represented) through which the de-icing fluid passes, from the inside of the tube 37 to the inside of the cavity 15 of the air inlet lip 13.

In other forms, the de-icing fluid supply device may be carried out by a system for rotating circulation of a de-icing fluid, such as a "swirl" tube.

Figure 7:
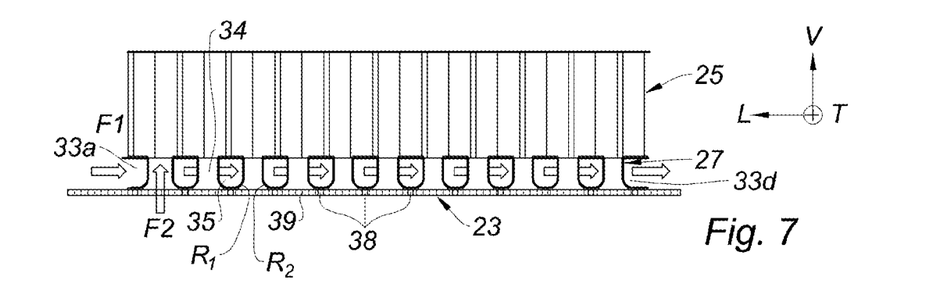
FIG. 7 is a longitudinal cross-sectional view of the assembly formed by the inner wall of the air inlet lip obtained according to the first form, and by the cellular de-icing base plate/acoustic treatment device pair, according to the teachings of the present disclosure.

Reference is made to FIG. 7 which illustrates a cross-sectional view of the assembly formed by the inner wall 23 of the air inlet lip, and by the cellular de-icing base plate 27/acoustic treatment device 25 pair.

When the de-icing fluid is introduced into the cavity 15 of the air inlet lip 13 through the Piccolo tube, the de-icing fluid circulates in the cellular de-icing base plate 27 by flowing through the conduits 35 for circulating the de-icing fluid of the cellular de-icing base plate, from the upstream lateral wall 33a and to the downstream lateral wall 33d of the cellular de-icing base plate (arrow F1). The sound waves (represented by the arrow F2) from the propulsion unit pass through the acoustic wells 34 of the cellular de-icing base plate 27 and are then acoustically attenuated by the acoustic treatment device 25.

As schematically represented in FIG. 7, the cellular de-icing base plate 27 is fastened on the inner wall 23 of the air inlet lip 13 by braze points 38 (the realization of the fastening of the cellular de-icing base plate to the inner wall of the lip is further explained in the following description with reference to FIGS. 13 to 15).

The acoustic wells 34 of the cellular de-icing base plate are connected to the inner wall 23 at the braze points 38 via two spokes R1, R2, allowing increasing the acoustic opening surface of the cellular de-icing base plate. By way of example, the acoustic surface defined by the projection of the acoustic wells 34 on the surface for installing the cellular de-icing base plate defines about 75% of the total surface of the cellular de-icing base plate.

Figure 8:
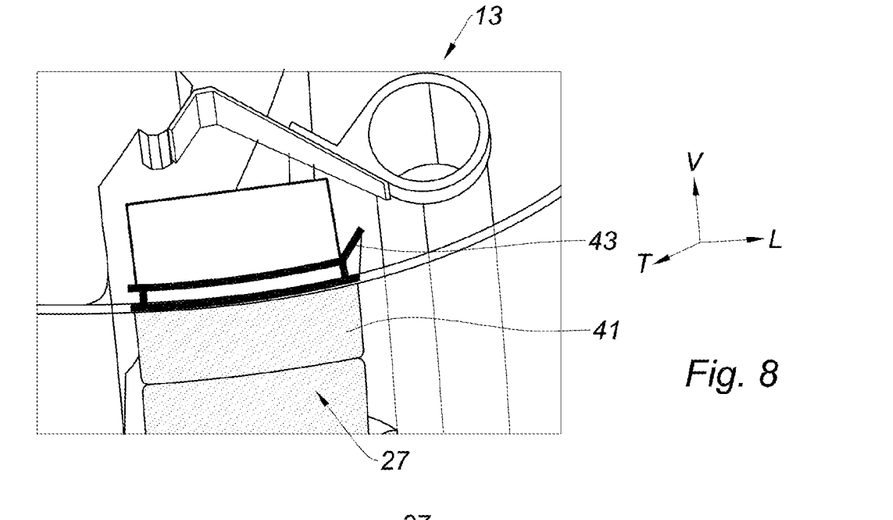
FIG. 8 is a variation of the air inlet lip of the first form, according to the teachings of the present disclosure.

According to a variation represented in FIG. 8, an upstream edge 41 of the cellular de-icing base plate 27, when it is mounted in the air inlet lip 13, includes a deflector 43 used to increase the amount of de-icing fluid, from the tube 37, captured by the cellular de-icing base plate.

Alternatively, the de-icing base plate includes at least one exchange surface configured to conduct the de-icing fluid from the de-icing fluid supply device 26 by conduction through the cellular de-icing base plate. The cellular de-icing base plate thus behaves as a radiator or a heat exchanger.

According to the first form of the air inlet lip which has just been described with reference to FIGS. 6 to 8, the circulation of the de-icing fluid in the cellular de-icing base plate is called ambient.

Figure 9:
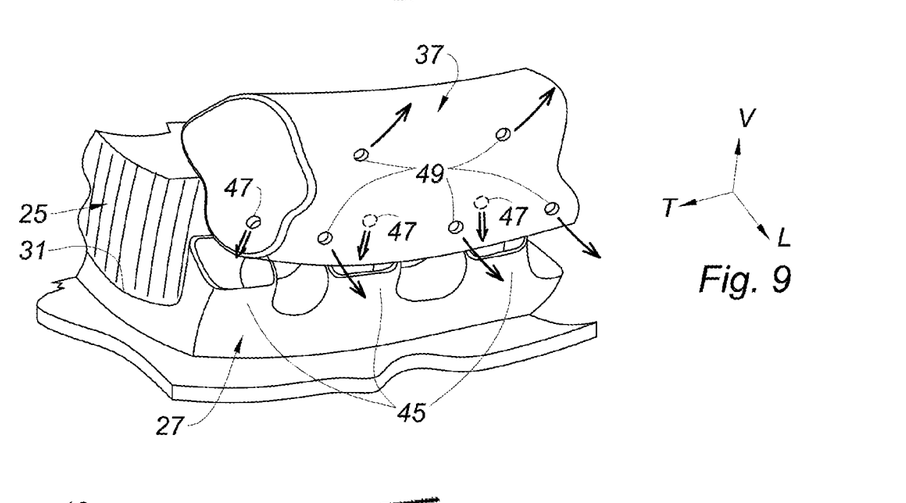
FIG. 9 illustrates a second form of the air inlet lip, according to the teachings of the present disclosure.

According to a second form represented in FIG. 9 to which reference is now made, the circulation of the de-icing fluid in the cellular de-icing base plate is called semi-forced.

The cellular de-icing base plate 27 includes at the upstream edge 41 thereof a set of nozzles 45 for injecting the de-icing fluid. The de-icing nozzles communicate with the conduits for circulating of the de-icing fluid, which open at the top wall 31 of the cellular de-icing base plate 27.

Each nozzle 45 for injecting the de-icing fluid is arranged substantially opposite to a bore 47 of the tube 37 for injecting the de-icing fluid.

In the exemplary form of FIG. 9, the three bores 47 of the tube 37 supply the three nozzles 45 for injecting the de-icing fluid. It is considered to provide as many injection nozzles 45 as there are bores 47.

Bores 49 of the tube 37 inject the de-icing fluid into the cavity of the air inlet lip.

Figure 10:
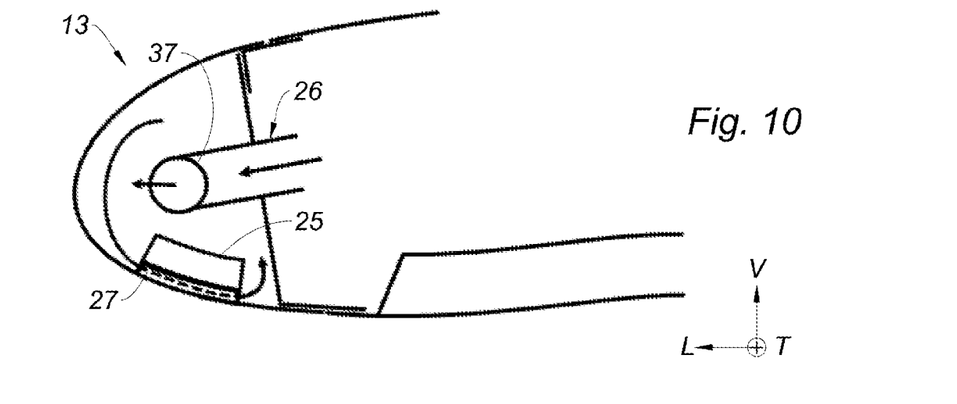
FIG. 10 is a schematic view illustrating the operating principle of the air inlet lip obtained, according to the first or the second forms of the present disclosure.

According to the first and second forms which have just been described, the tube 37 for supplying the de-icing fluid supplies the cellular de-icing base plate 27 from upstream to downstream of the cellular de-icing base plate 27, as schematically represented in FIG. 10.

Figure 11:
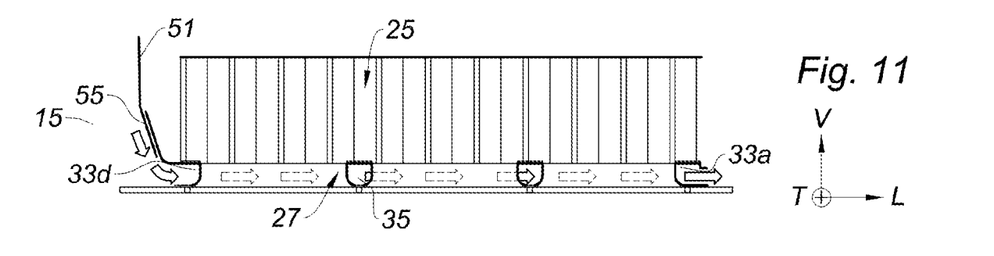
FIG. 11 is identical to that of FIG. 7, detailing a third form of the present disclosure.
Figure 12:
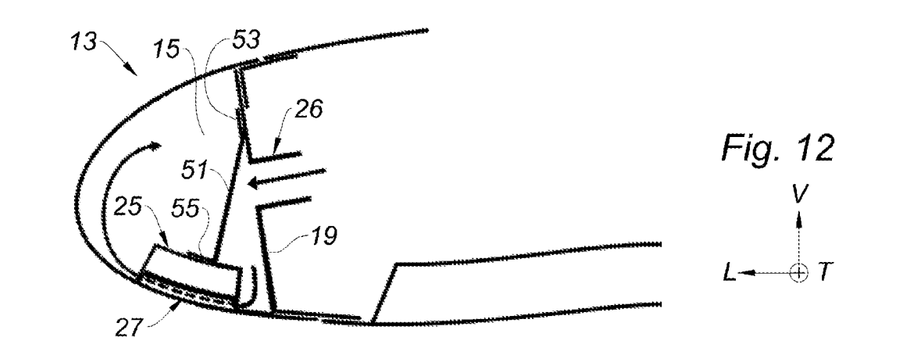
FIG. 12 is a schematic view illustrating the operating principle of the air inlet lip obtained, according to the third form of the present disclosure.

According to a third form represented in FIGS. 11 and 12 to which reference is now made, the de-icing fluid supply device 26 no longer includes a tube 37. The cavity 15 of the air inlet lip 13 receives a wall 51 for blocking the de-icing fluid, annularly mounted upstream of the outlet of the de-icing fluid supply device 26. The wall 51 is configured and arranged in the cavity 15 of the air inlet lip so as to block the diffusion of the de-icing fluid from the de-icing fluid supply device 26 beyond the wall 51. The de-icing fluid, when introduced into the cavity 15 of the air inlet lip is then forced to circulate in the cellular de-icing base plate 27 via the conduits 35 for circulating the de-icing fluid, from the downstream lateral wall 33d to the upstream lateral wall 33a of the cellular de-icing base plate 27.

The wall 51 for blocking the de-icing fluid includes a first fastening edge 53, attached to the annular partition 19, and a second fastening edge 55, attached to the acoustic treatment device 25 or to the cellular de-icing base plate 27.

The cellular de-icing base plate 27 of the present disclosure can be obtained from thick sheet metals including chemical or mechanical machining. The cellular de-icing base plate can also be obtained in foundry or in additive manufacturing.

The different methods for fastening the cellular de-icing base plate 27 on the inner wall 23 of the air inlet lip are now described with reference to FIGS. 13 to 15.

Figure 13:
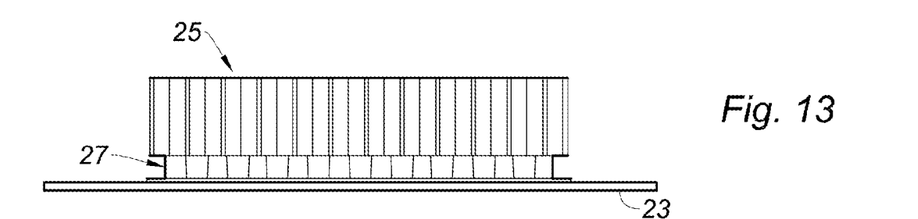
FIG. 13 illustrates a first form of the fastening of the cellular de-icing base plate on the air inlet lip, according to the teachings of the present disclosure.

A first form of the fastening of the cellular de-icing base plate on the inner wall of the air inlet lip illustrated in FIG. 13 comprises brazing and/or gluing the cellular de-icing base plate 27 on the inner wall 23 of the air inlet lip.

Figure 14:
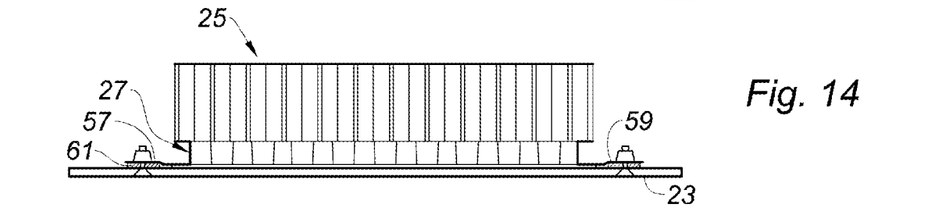
FIG. 14 illustrates a second form of the fastening of the cellular de-icing base plate on the air inlet lip, according to the teachings of the present disclosure.

According to a second form of the fastening of the cellular de-icing base plate 27 on the inner wall 23 of the air inlet lip illustrated in FIG. 14, the cellular de-icing base plate 27 includes fastening edges 57, 59, which are riveted or screwed to the inner wall 23. A seal 61 can be mounted between each fastening edge 57, 59 and the inner wall of the air inlet lip.

Figure 15:
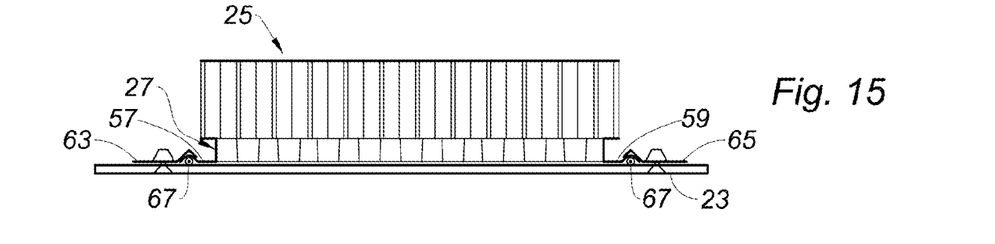
FIG. 15 illustrates a third form of the fastening of the cellular de-icing base plate on the air inlet lip, according to the teachings of the present disclosure.

According to a third form of the fastening of the cellular de-icing base plate 27 on the inner wall 23 of the air inlet lip illustrated in FIG. 15, the cellular de-icing base plate 27 includes fastening edges 57, 59, fastened on the inner wall 23 of the air inlet lip via fastening flanges 63, 65 riveted or screwed on the inner wall of the air inlet lip.

A seal 67 can be mounted between each fastening edge 57, 59 and the inner wall 23 of the air inlet lip.

According to a variation common to the forms which have just been described, the top wall 31 of the cellular de-icing base plate 27 may include a plurality of bores communicating between the cellular de-icing base plate and the acoustic treatment device, so as to allow an acoustic continuity between the acoustic treatment device and the cellular de-icing base plate.

Of course, the present disclosure is not limited to the only forms of this air inlet lip, described hereinabove only by way of illustrative examples, but it encompasses, on the contrary, all variations involving the technical equivalents of the described processes as well as the combinations thereof if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An air inlet lip of a nacelle for an aircraft turbojet engine, the air inlet lip comprising a cavity delimited, on a first side of the cavity by a leading edge of the nacelle, and on a second side of the cavity by an annular partition, the air inlet lip further comprising:
   an inner wall;
   an acoustic treatment device; and
   a pneumatic de-icing device including a de-icing fluid supply device, wherein the inner wall of the air inlet lip comprises a plurality of acoustic bores and the pneumatic de-icing device comprises at least one cellular de-icing base plate, mounted inside the cavity on the inner wall of the air inlet lip, the cellular de-icing base plate comprising a plurality of conduits for circulating a de-icing fluid from the de-icing fluid supply device and a plurality of acoustic wells communicating with the plurality of acoustic bores of the inner wall of the air inlet lip, and the acoustic treatment device being fastened on a top wall of the cellular de-icing base plate and at least partially superimposed on the cellular de-icing base plate, and
   wherein an area of the top wall of the cellular de-icing base plate is substantially equal to an area of a bottom wall of the acoustic treatment device.

2. The air inlet lip according to claim 1, wherein the acoustic wells of the cellular de-icing base plate open at bottom and top lateral walls of the cellular de-icing base plate.

3. The air inlet lip according to claim 1, wherein the conduits for circulating the de-icing fluid of the cellular de-icing base plate open at least at upstream and downstream lateral walls of the cellular de-icing base plate.

4. The air inlet lip according to claim 1, wherein the cellular de-icing base plate comprises at least one deflector arranged to capture the de-icing fluid from the de-icing fluid supply device.

5. The air inlet lip according to claim 1, wherein the de-icing fluid supply device comprises a tube for injecting the de-icing fluid arranged inside the cavity of the air inlet lip, the injection tube comprising a plurality of bores configured to deliver the de-icing fluid inside the cavity, wherein the cellular de-icing base plate comprises at least one de-icing fluid injection nozzle communicating with at least one of the conduits for circulating the de-icing fluid, the at least one de-icing fluid injection nozzle being arranged substantially opposite to at least one of the bores of the tube for injecting the de-icing fluid.

6. The air inlet lip according to claim 1, wherein the cavity of the air inlet lip receives a wall for blocking the de-icing fluid, annularly mounted upstream of an outlet of the de-icing fluid supply device.

7. The air inlet lip according to claim 1, wherein the cellular de-icing base plate of the pneumatic de-icing device has a thickness between 2 mm and 20 mm.

8. The air inlet lip according to claim 1, wherein the conduits for circulating the de-icing fluid are unevenly distributed inside the cellular de-icing base plate.

9. The air inlet lip according to claim 1, wherein the cellular de-icing base plate is fastened on the inner wall of the air inlet lip by at least one of brazing and gluing.

10. The air inlet lip according to claim 1, wherein the cellular de-icing base plate comprises an edge for fastening to the inner wall of the air inlet lip, the fastening edge being connected to the inner wall by at least one of riveting and screwing.

11. The air inlet lip according to claim 1, wherein the cellular de-icing base plate comprises an edge for fastening to the inner wall of the air inlet lip and the air inlet lip comprises a flange for fastening the cellular de-icing base plate, the fastening flange being mounted on the inner wall of the air inlet lip and on the edge for fastening the cellular de-icing base plate.

12. The air inlet lip according to claim 1, wherein the acoustic treatment device is fastened on the top wall of the cellular de-icing base plate by at least one of gluing, brazing, riveting, and screwing.

13. The air inlet lip according to claim 1, wherein the air inlet lip comprises a plurality of cellular de-icing base plates distributed over an entire circumference of the inner wall of the air inlet lip.

14. The air inlet lip according to claim 1, wherein the cellular de-icing base plate of the pneumatic de-icing device has a thickness between 5 mm and 15 mm.

15. An air inlet lip of a nacelle for an aircraft turbojet engine, the air inlet lip comprising a cavity delimited, on a first side of the cavity by a leading edge of the nacelle, and on a second side of the cavity by an annular partition, the air inlet lip further comprising:
   an inner wall;
   an acoustic treatment device; and
   a pneumatic de-icing device including a de-icing fluid supply device, wherein the inner wall of the air inlet lip comprises a plurality of acoustic bores and the pneumatic de-icing device comprises at least one cellular de-icing base plate, mounted inside the cavity on the inner wall of the air inlet lip, the cellular de-icing base plate comprising a plurality of conduits for circulating a de-icing fluid from the de-icing fluid supply device and a plurality of acoustic wells communicating with the plurality of acoustic bores of the inner wall of the air inlet lip, and the acoustic treatment device being fastened on a top wall of the cellular de-icing base plate and at least partially superimposed on the cellular de-icing base plate, and
   wherein the top wall of the cellular de-icing base plate comprises at least one bore communicating between the cellular de-icing base plate and the acoustic treatment device.

\* \* \* \* \*